United States Patent [19]
Gorille et al.

[11] 4,063,539
[45] Dec. 20, 1977

[54] SYSTEM TO CONTROL TIMING OF CYCLICALLY REPETITIVE EVENTS, PARTICULARLY AUTOMOTIVE IGNITION

[75] Inventors: Ingo Gorille; Wolfgang Borst; Winfried Klötzner; Karl Ott, all of Schwieberdingen; Heinz Möller, Stuttgart; Günter Hönig, Markgroningen; Uwe Kiencke, Ludwigsburg; Martin Zechnall, Schwieberdingen; Ulrich Flaig, Markgroningen; Alfred Schulz, Braunschweig; Ernst-Olav Pagel, Freiberg, all of Germany

[73] Assignee: Robert Bosch G.m.b.H., Stuttgart, Germany

[21] Appl. No.: 650,971

[22] Filed: Jan. 21, 1976

[30] Foreign Application Priority Data

Feb. 6, 1975 Germany .............................. 2504843

[51] Int. Cl.² .............................................. F02B 5/02
[52] U.S. Cl. .............................. 123/117 D; 123/32 EB
[58] Field of Search ................... 235/150.2, 150.21; 123/117 R, 117 D, 32 EB

[56] References Cited

U.S. PATENT DOCUMENTS

| | | | |
|---|---|---|---|
| 3,752,139 | 8/1973 | Asplund | 123/117 D |
| 3,903,857 | 9/1975 | Honig et al. | 123/117 D |
| 3,904,856 | 9/1975 | Monpetit | 235/150.21 |
| 3,927,648 | 12/1975 | Kawai et al. | 123/117 D |
| 3,942,491 | 3/1976 | Siete et al. | 123/117 D |

*Primary Examiner*—Samuel W. Engle
*Assistant Examiner*—S. A. Cangialosi
*Attorney, Agent, or Firm*—Flynn & Frishauf

[57] ABSTRACT

Operating parameters, such as speed and loading of the engine are converted in electrical signals which are converted into pulse rates, to control counting of an address counter, addressing a read-only (ROM) memory in which characteristics of the engine are stored. To provide easy introduction of additional parameters such as temperature, idle condition, maximum speed, start condition, etc., the final value of an accumulator counter, the number of which at a given time controls the ignition timing, can be changed; further, to simplify the system, the speed and load signals are processed during a portion of the time between successive ignition events, the remaining portion of the time being controlled solely by one of the parameters (preferably speed), thus simplifying the circuitry by providing a transfer switch connecting for the remaining period only the selected (preferably speed) signal to the accumulator counter, the count state of which controls the ignition instant.

31 Claims, 19 Drawing Figures

SYSTEM TO CONTROL TIMING OF CYCLICALLY REPETITIVE EVENTS, PARTICULARLY AUTOMOTIVE IGNITION

The present invention relates to a control system to control the timing of cyclical events which depend on operating parameters of an apparatus, and more particularly to a control system to determine the ignition instant for internal combustion engines using spark plugs, in which the ignition timing is dependent on operating conditions and parameters of the engine itself, as well as upon extraneous conditions, such as its temperature, composition of exhaust gas emitted thereby, and the like.

The timing of ignition in Otto-type internal combustion engines has a definite effect on the composition of the exhaust gases emitted from the internal combustion engine. Increasingly severe requirements regarding the components of the exhaust gases require that the highest possible percentage of components in the fuel-air mixture be completely burned, so that the emission of noxious components from the exhaust is a minimum. To determine the optimum timing of the ignition instant, various parameters must be considered. The principal conditions are the speed of the engine and its loading; additionally, however, temperature, whether the engine is under starting condition or idling, and other operating or extraneous conditions, form an element in the determination of the ignition instant, that is, of ignition timing with respect to a predetermined position of the piston in the cylinder, for example upper dead-center (UDC) position. This ignition timing should be reliable and not subject to extraneous variations or influences, and independent of the operating time or age of the engine. Digital data processing technology is eminently suitable in this connection.

Various methods and systems have been proposed to determine the ignition of internal combustion engines. In one such arrangement, a pulse source in form of a disk is coupled to the shaft, for example the crankshaft of the engine. The circumference of the disk is formed, over a portion thereof, with two different rows of teeth. The first tooth of each row marks the beginning of the actual calculating or counting steps. A predetermined time interval is developed to count the number of teeth of one of these rows in this interval. The number of teeth so counted — per unit of time, that is, per time interval — is a measure of the speed of the engine. A further row or group of teeth, sequentially following the first, is then scanned starting from a predetermined angle, and the pulses previously counted to determine speed are added thereto. The final count state is then used to determine the ignition instant, by generating a trigger signal. With increasing speed, the number of pulses applied to the counter during the constant time interval will increase; subsequently, a lesser number of pulses is necessary until a certain predetermined end value is reached. The ignition instant is, therefore, automatically advanced with respect to UDC position as the speed increases. Other operating parameters can also be considered. Thus, the count state of the counter can be varied by changing the timing interval.

Such systems have some disadvantages which are particularly concerned with the limited possibility of adherence to non-linear operating vs. timing characteristics of the engine. It is also not possible to accomodate a characteristic which is dropping, that is, to accomodate a parameter-timing curve which has a negative slope.

It is an object of the present invention to provide a digitally controlled ignition system which permits fine adjustment of the ignition timing instant and readily permits matching of the operating characteristic to conditions such as speed, loading, temperature, and other operating or surrounding conditions or parameters of the engine, and in which the possibilities of variation are great. Further, the characteristic curves according to which the system operates should be able to accomodate all types of curves, particularly curves having a negative slope.

SUBJECT MATTER OF THE PRESENT INVENTION

Briefly, separate sensing means provide output signals representative of sensed operating parameters, which output signals are converted into digital signals and counted in separate counters. An end or accumulator counter is provided totalizing the counted signals and providing an output pulse when a selected count number is reached. Connected between the counters counting the pulses from the sensors are a memory and a transfer switch connected to shunt or bypass the counted signals from at least one of the counters across the memory.

The memory can store values or numbers having different signs and, therefore, a characteristic curve can be developed in the memory which has also negative values, thus negative slopes in the curve. The characteristic curves, the slopes of which are to be stored, thus can be generated and stored in the memory as desired, so that the ignition pulse will be generated with optimum timing. The various stored values are recalled, for example by interrogation of the memory, in a preferred form of the invention by including at least one address counter in series with the memory, the address counter having signals applied thereto depending on operating parameters. The operating parameters here being considered are primarily speed and load which, as known, have the greatest influence with respect to ignition timing. Additionally, however, other parameters may be used such as temperature and operating conditions for consideration with respect to the output signal to be derived from the memory.

Sudden changes of one operating condition may involve sudden shifts in ignition timing. Due to the speed of electronic data processing, the motor way, therefore, not react within its own normal inertia time and thus the motor may be subjected to vibration, rumble, or bucking. To avoid bucking and other rough operations of the engine due to rapid changes in the ignition timing, a limiter stage is preferably used so that the change in the ignition timing, that is, the angle of ignition timing, cannot exceed a predetermined value. Limits can readily be generated by providing a limiter stage connected to the accumulator or final end counter, since the limiter need only compare the timing of the just generated timing pulse with that of the preceding pulse. The ignition instants or pulses are located at 180° with respect to each other — measured on the crankshaft of the engine. The limiter stage can be so arranged that the actual ignition timing can change only in a much narrower interval, for example between 178° and 182° after, the preceding ignition event.

The present invention is applicable not only to four-cylinder engines but to engines having any number of cylinders, for example six, eight or 12. It is universally useful for internal combustion engines of any number of cylinders, although an increase in the number of cylinders may cause more calculating steps during any one revolution of the crankshaft to be required.

The invention will be described by way of example with reference to the accompanying drawings, wherein:

FIG. 6.1 is a digital curve representative of a characteristic;

FIG. 6.2 is a digital representation of the first derivative of the curve of 6.1;

Figure 1:
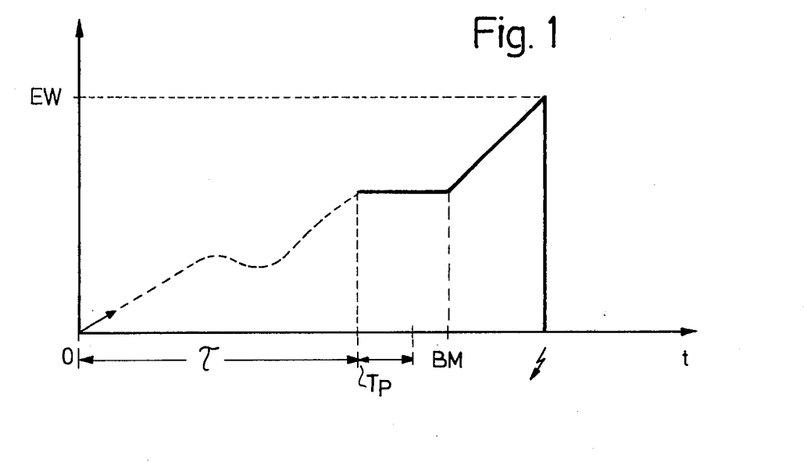
FIG. 1 is a counting diagram for the accumulator counter, with respect to time.

FIG. 1 is generally illustrative of the way counting is carried out in accordance with the present invention, as contrasted with prior art systems. The state or count number of an accumulator counter connected to a memory is shown on the ordinate, with respect to time (abscissa). The lightning arrow illustrates the ignition instant. The count number or counter state is reset with each ignition signal to a predetermined start value. The contents of a memory are summed in the accumulator during a predetermined time $\tau$. At a certain reference marker BM, the pulses of a pulse group are added having a repetition rate or frequency which depends on speed. If the counter state then reaches a predetermined accumulated number EW, as determined by certain operating conditions, then a new ignition signal or ignition event is triggered, and the cycle repeats.

The speed-dependent ignition timing change is calculated during the constant period $\tau$. Simultaneously, other operating conditions affecting the ignition angle calculations can be considered, so that, after the time $\tau$, the actual ignition angle can be completely calculated. The reference marker BM is associated with the crankshaft, that is, with a fixed angular crankshaft position with respect to UDC position of the piston and thus unambiguously determines the ignition advance or retardation angle with respect to UDC position of the piston of the respective cylinder. Due to the fixed association of the angle with the crankshaft, the counting rate after the marker BM must occur with the frequency which is practically synchronous with change in angular position of the crankshaft. The limit marker BM must be placed in advance of UDC position by an angle which is greater than the greatest ignition advance angle which is within the design limits of the engine.

The influence of operating parameters which are sensed and transformed into binary signals can be considered also by suitable change or shift of the final accumulated value EW. One such signal which may be so used is, for example, the signal representative of throttle position.

In another alternative, only the speed-dependent change is calculated during the time $\tau$, and any change in ignition timing due to loading is then calculated during a time period Tp.

The ignition instant or ignition timing thus can be changed in various ways:
1. by selecting the initial value of the accumulator;
2. by the contents of the memory;
3. by control of the counting time $\tau$ or Tp, respectively; and
4. by suitable selection or change of the final value in the accumulator at which the ignition instant is triggered, that is, the value EW.

The memory preferably has storage capacity so that speed and load can be considered; the final value EW is preferably moved up and down as a function of temperature, as well as various operating parameters of the internal combustion engine, such as operating under starting conditions, idling condition, or the like. Additional values of modifying the calculated result are possible with respect to either the memory or the final value EW; for example, a position representative of the throttle of the engine, or temperature threshold values.

Other characteristics, depending on operating parameters, for example characteristics depending on temperature, can be generated and stored and considered, similar to speed or loading; these characteristics stored in the memory are suitably processed by the system.

Figure 2:
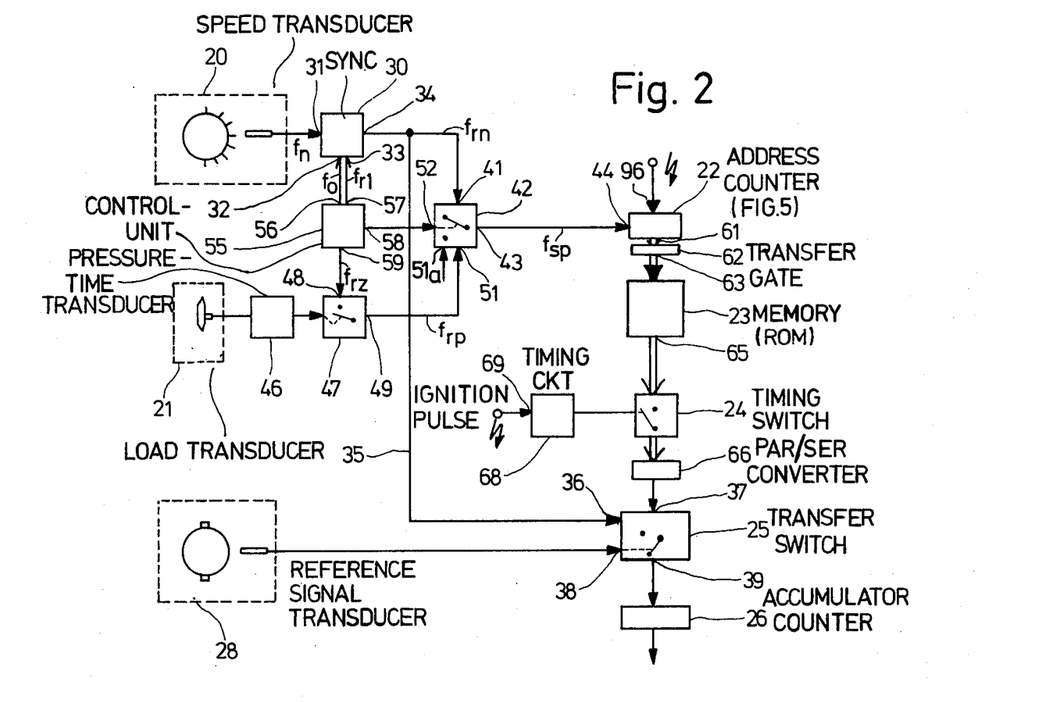
FIG. 2 is a highly schematic and simplified block circuit diagram of the system in accordance with the present invention.

A simplified block circuit diagram of a system is shown in FIG. 2. The basic components of the system are two transducers to sense basic operating parameters, in the present embodiment (when applied to an internal combustion engine) a speed transducer 20 and a load transducer 21. Other important components are an address counter 22, a memory 23 in the form of a read-only memory (ROM), a timing switch 24, a transfer switch 25, and an accumulator counter 26. Each pulse applied to the address counter, be it a speed pulse or a load pulse, generates a predetermined memory address. The exact function will be described below. The values stored in the respective storage addresses are retrieved during a predetermined period and applied to the accumulator 26 over transfer switch 25. A reference signal transducer 28 is connected to the transfer switch 25 so that, after generation of the signal corresponding to the reference marker BM, the speed signals 20 are directly applied to the transfer switch 25, shunting the memory and the associated elements.

Detailed structure of system of FIG. 2: Speed transducer 20 is connected to a synchronization stage 30, supplying output signals at a speed frequency $f_n$. The synchronization stage has two frequencies applied thereto, a clock frequency $F_o$ and a scanning frequency $f_{r1}$. The respective inputs to the synchronization stage are shown at 31, 32, 33. The output 34 from stage 30 has two branches; the frequency $f_m$ appearing thereon is, on the one hand, conducted to input 41 of a switch 42. The output 43 of switch 42 connects to input 44 of address counter 22. The other branch of the output 34 from synchronization stage 30 on which the speed scanning signals $f_m$ appear is connected to input 36 of the transfer switch 25. Transfer switch 25 selectively connects the input 37 thereof to the output 39, or the input 36 thereof to the output 39, under control of the signal at input 38.

The load signal transducer 21 is connected over a pressure-time transducer 46 to a switch 47 which, in dependence on the output signal from transducer 46, connects input 48 of switch 47 to the output 49 thereof. Output 49 is connected with a further input 51 of switch 42. The position of transfer switch 42 is controlled from intput 52 which has an output signal from terminal 58 of control unit 55 applied thereto. Control unit 55 also provides output from terminal 59 to the input terminal 48 of the switch 47.

The control unit 55 includes an oscillator, a counter, and a decoding circuit formed of logic gates for various count states. The output 61 of the address counter 22 has a transfer gate 62 connected thereto, the output 63 of which is connected to the input of the ROM 23. The data derived from ROM 23 are obtained as a number; the accumulator 26 can add only serially, however, and therefore the output 56 of ROM 23 is connected to a parallel/series converter 66 which, as shown, is preferably connected between the timing switch 24 and the transfer switch 25. The timing switch 24 is controlled by a timing circuit 68 which is activated over input 69 by an ignition pulse from a pulse terminal.

Temperature sensors and other parameter-responsive signal generators may additionally be used besides the load transducer 21 and speed transducer 20. The additional parameter-responsive sensors can then be connected to further terminals or contacts of the transfer switch 42. If so, then additional special curves representative of temperature characteristics can be stored in th ROM 23. Such additional inputs to transfer switch 42, which then would be in the form of a cyclically operating selector switch, are symbolically shown by the single input 51a which, however, as noted, may represent a plurality of separate inputs.

Operation: Each ignition signal resets the address counter 22 and the accumulator 26 on a predetermined start value — for example zero, or a value greater than zero, if the accumulator can count upwardly as well as downwardly. Simultaneously, timing circuit 68 provides an output signal to timing switch 24 to close switch 24 and connect the output from ROM 23 through PAR/SER converter 66, and transfer switch 25 to the accumulator counter 26. The transfer switch 25, in this condition, connects the input terminal 37 to the output 39. Values which are read in ROM 23 are thus transferred over the PAR/SER converter 66 in the accumulator. The address counter 22 counts, depending on position of the transfer switch 42, pulses which depend either on speed or load. This causes the respective addresses in the ROM 23 to be addressed, as commanded by the count state of the address counter 22, and the respective values stored in the ROM 23 are retrieved. After change-over of timing circuit 68, the numbers derived from ROM 23 are interrupted. If, at that time, transfer switch 25 does not change, then the accumulator counter will not change its count number either. When the reference marker BM applies a reference signal, however, to input 38 of transfer switch 25, a block or group of pulses will be applied to the accumulator counter 26 directly at a rate or frequency representative of speed, bypassing or shunting counter 22, ROM 23 and associated components. When the counter then reaches a predetermined final value EW, an ignition pulse or trigger signal will be generated.

The first counting cycle must be finished before a signal occurs at the output of the reference signal transducer 28. The timing period, that is, the switching time of timing circuit 68 thus must be matched to the maximum speed of the internal combustion engine, as well as to the speed of the speed transducer 20. It must also be matched to the number of cylinders of the engine. Any type of reference signal source may be used which provides reference signals at a predetermined angular position of the crankshaft with respect to upper dead-center position of the particular piston involved.

To obtain fine adjustment of the ignition timing angle, a frequency multiplier stage is preferably connected serially to the speed transducer 20. A frequency doubler is suitable.

Figure 3A:
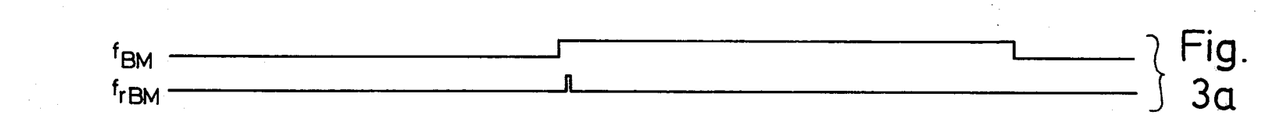
FIGS. 3a to 3e are timing diagrams illustrating the operation of the system.

Synchronization: FIG. 3a shows the signal $f_{BM}$ which is derived from one type of frequency transducer. Differentiating the signal and wave-shaping results in a pulse $f_{rBM}$. The operation of the synchronizing stage 30 is best understood when considering the three diagrams of FIG. 3b.

Figure 3B:
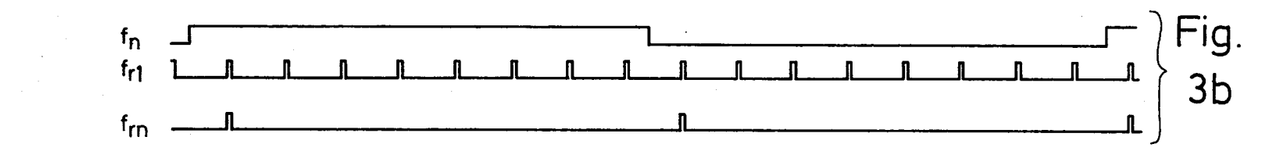
Figure 3C:
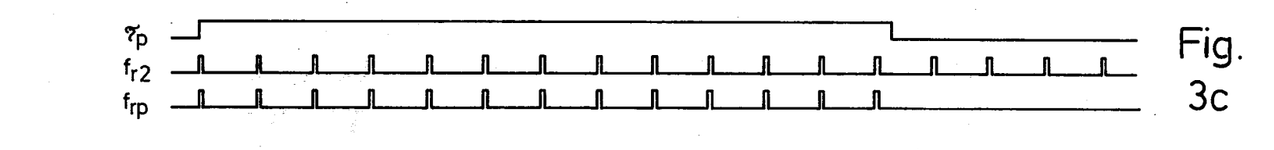

Synchronization is needed since the address counter 22 processes the speed signal and the load signal in separate scans. The relationship of the two scanning or strobing frequencies $f_{r1}$ and $f_{r2}$, as well as the scanned or strobed signals $f_m$ and $f_{rp}$, are seen in FIGS. 3b and 3c. $f_n$ is the signal derived from speed transducer 20. $f_{r1}$ is the scanning or strobing frequency which is assigned to the speed signal. $f_m$ is the output signal from the synchronizing stage 30. These signals are also so indicated in FIG. 2. $T_p$ is the gating time derived from the pressure-time transducer 46. $f_{r2}$ is the scanning or strobing frequency assigned to the load signal. $f_{rp}$ is the pulse sequency or pulse group used in the circuit to characterize the loading.

Scanning and synchronizing have the result that for each pulse duration or pulse span of the cyclical signal of the speed transducer 20, a pulse of defined length occurs at a predetermined instant of time at the output of the synchronizing stage 30.

Synchronizing and strobing or scanning has two objects: For one, it has the advantages or processing above referred to and, for another, it improves the noise and interference rejection of the entire system when operating. Immunity against interference is thus enhanced.

Signals from the speed transducer 20 are strobed by the scanning frequency $f_r$ in this manner: An output signal is derived at output 34 of synchronizing stage 30 coincident with the next strobing or scanning pulse occuring after a signal of the speed transducer. The pulse duration of the speed signal is determined by the clock frequency $f_o$. The input frequency is doubled as will appear below.

Due to the synchronous multiplexing of the scanning frequencies $f_{r1}$ and $f_{r2}$, it is possible to process speed and load signals in time-multiplex operation. The pulse sequence $f_{sp}$, FIG. 3d, indicates the time periods in which the memory is addressed and provides output signals which at these instants of time then can be accumulated in the accumulator 26.

Figure 4:
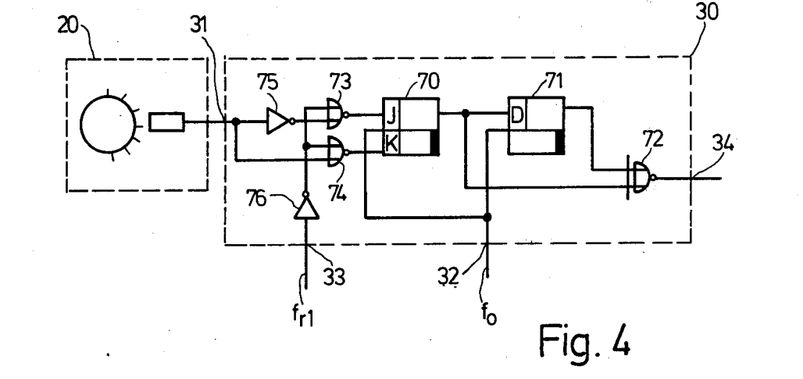
FIG. 4 is a schematic fragmentary circuit diagram showing synchronization of the speed signal.

A detailed circuit of the synchronizing stage 30 is shown in FIG. 4, in which similar elements and terminals have been given the same reference numerals as in FIG. 2. The synchronizing stage, in general, is a JK flip-flop (FF) 70, a D-FF 71 and an exclusive OR-gate 72. Both the JK-FF's and the D-FF's are well known in the literature and do not need further description. The clock inputs of the two FF's 70, 71 are connected to the clock inputs 32 having frequency $f_O$ applied. Two NOR-gates 73, 74 are connected to the respective inputs of the JK-FF 70. One input, each, of the NOR-gates 73, 74 is connected to the output of an inverter 76, the input of which is connected to terminal 33 having the scanning frequency $f_{r1}$ applied thereto. The other two inputs of the NOR-gates 73, 74 are connected, respectively, directly to the input 31 and through an inverter 75. The direct output of the JK-FF 70 is connected with the D-input of FF 71, and to one input of an EXCLUSIVE-OR-gate 72. The D-input of FF 71 is the delay input thereof. A further input of the EXCLUSIVE-OR-gate 72 is connected to the direct output of the D-FF 71. The output of the EXCLUSIVE-OR-gate 72 is the output 34 of the synchronizing stage.

Figure 3D:
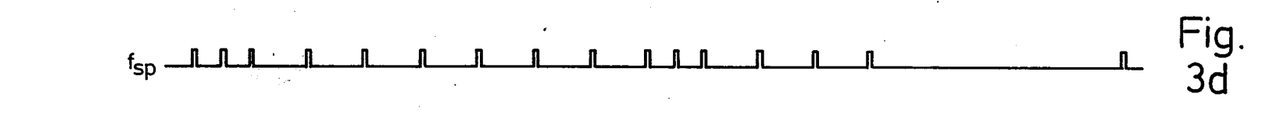

The strobing of the signals from the speed transducer 20 by the frequency $f_{r1}$ results in the output signals $f_m$, FIG. 3d. The pulse duration of the strobed speed signal is determined by the clock frequency $f_O$, in combination with the D-FF 71 and the EXCLUSIVE-OR-gate 72. The use of the EXCLUSIVE-OR-gate 72 results in frequency doubling of the input signal.

Figure 5:
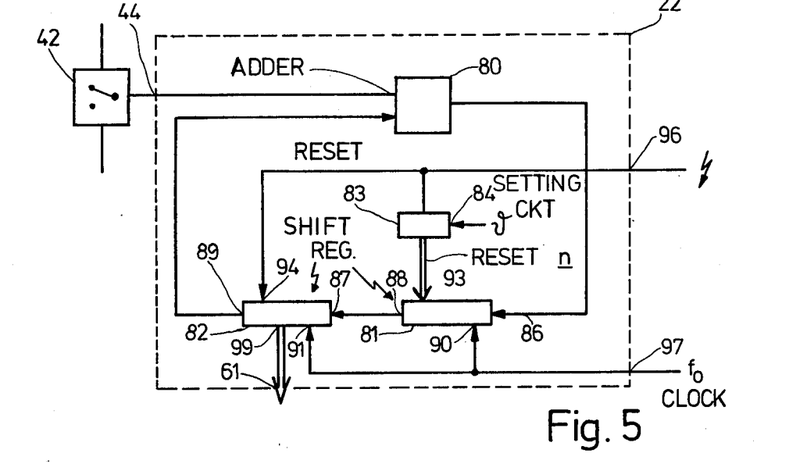
FIG. 5 is a schematic block circuit diagram of the internal organization of an address counter.

FIG. 5 is block diagram illustrating the components of the address counter 22 which processes the speed pulses as well as the load pulses (FIG. 3d, signal $f_{sp}$). The address counter 22 generally includes an adder circuit 80, two shift registers 81, 82 which, in the example selected, may have eight stages; and a setting circuit 83. The shift registers 81, 82 have serial inputs 86, 87 and serial output terminals 88, 89, as well as clock pulse terminals 90, 91 respectively. They have setting inputs 93, 94. Two further inputs 96, 97 are also shown, connected, respectively, to the ignition signal and to the clock frequency $f_O$. The clock frequency terminal has been omitted from FIG. 2 for clarity. The address counter is connected in this manner: Input 44 of the address counter is connected to the first input of adder circuit 80. The output of adder circuit 80 is connected to the input 86 of the first shift register 81. The output 88 of the first shift register 81 is connected to the input 87 of the subsequent shift register 82, the output of which is further connected to a second input of the adder circuit 80. Input 97 for the clock frequency is directly connected to the clock inputs 90, 91 of the shift registers. Input 96 for the ignition signal is connected directly to the setting input 94 of the second shift register 82 and over the setting circuit 83 with the setting input 93 of the first shift register 81. A signal at the ignition terminal input 96 provides a reset signal for the shift register 82 to reset it to zero. For the shift register 81, however, the reset is to a value determined by the setting circuit 83. The output word 61 from the address counter is obtained from the word-output 99 of the second shift register 82. The input 84 of the second circuit can be connected to a suitable sensor providing an output which sets the setting circuit 83 to provide a value other than zero for the reset of the first shift register 81, in accordance with the particular parameter selected.

Figure 3E:
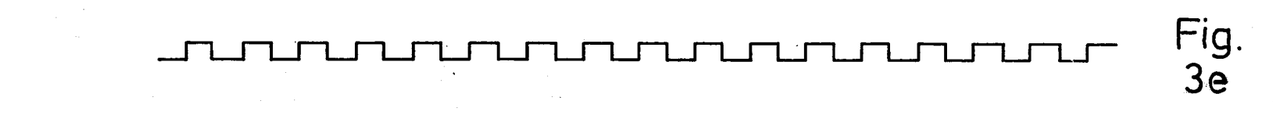

Operation: It is here assumed that two shift registers of eight stages are used. After each sixteenth clock pulse, then, the output terminal 61 will have the value of the shift register 82 incremented by the input 44. Likewise, and shifted in phase by eight pulses, output will be derived from the shift register 81. The switching frequency of the transfer switch 42 (FIG. 2, 5) thus must correspond to the eighth part of the clock frequency, as shown in the graph of FIG. 3e. The speed and load pulses, therefore, must be timed, by scanning or strobing, in view of the respective switch position of transfer switch 42. Adder circuit 80, in order to add correctly, can have applied thereto a speed pulse or a load pulse only after each eighth clock pulse, the speed pulses and load pulses alternating. The block diagram of FIG. 2 is simplified and it shows a transfer gate 62 connected in series to the address counter 22. Transfer gate 62 is so constructed that it accepts the value which is placed in the shift register 82 of the address counter 22 only at each eighth pulse.

The transfer switch 42 is not strictly necessary; in view of the scanning or strobing (see FIGS. 3b, 3c) an OR-gate may also be used.

The transfer gate 62 accepts the numerical value contained in the shift register 82 after each eighth clock pulse. Alternatively, then, an address for the speed, and for the load, respectively, will be addressed in the memory 23 (FIG. 2). In the example given, addresses 0-127 are reserved for speed, and addresses 129-191 for load. The load addresses can be further sub-divided in view of different temperatures. FIG. 5 illustrates, at input 84 of the setting circuit 83, that additional values can be introduced in the circuit. The memory addresses 128-159 may have values for adjustment based on load stored therein corresponding to a warm condition of the internal combustion engine, whereas the memory locations 160-191 can have values stored therein which are appropriate to ignition timing when the engine is cold.

Figure 61:
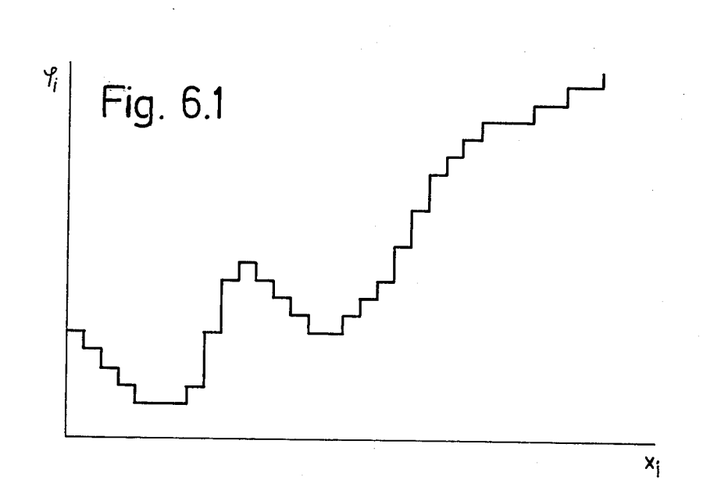
Figure 62:
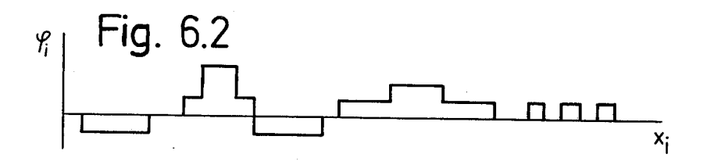

The desired characteristic of ignition angle with respect to speed must correspond to a counting process with respect to time. The time reference is obtained by switch 24 (FIG. 2). Switch 24 is controlled by timing circut 68 which permits of a result only during a predetermined period of time. FIG. 6 illustrates a curve, in digital representation, which has both positive and negative slope. If this curve is to be reproduced in a counter, then it is only necessary to provide an initial input value and then the addition of values proportional to the slope. The various values representative of slope of the digital curve of FIG. 6.1 is illustrated in FIG. 6.2.

The memory should meet certain requirements: (a) Positive and negative slopes can be considered by an additional sign bit, or, indirectly, by coding of the numerical representation; (b) the memory capacity increases with increasing depth of slope; (c) storing of slope characteristics of the engine characteristic curves is advantageous due to the small number of bits which have to be stored.

The curve of FIG. 6.1 is formed by adding the various slope values to a certain initial value.

Storing values representative of slope or rate of change of the characteristic curve is used for all the characteristic curves of the engine.

The invention can also be used with memory systems in which the absolute values of the function representative of the engine characteristic are stored directly. This, however, places greater demands on the requirements and cost of the system. If the memory is so constructed, then the transfer gate 62 accepts the address information only once for each operating parameter in question for each calculating or processing cycle, rather than accepting address information after each eighth clock pulse, as in the exmple specifically described. The accumulator 26 then has to add — serially — only so many binary words as operating parameters are being sensed and which influence the values being stored in the memory.

Figure 7:
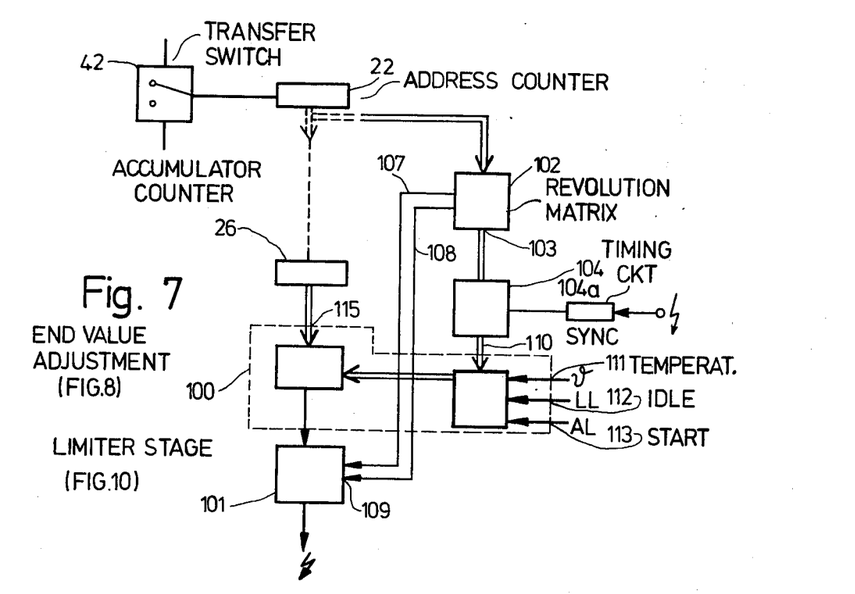
FIG. 7 is a fragmentary circuit diagram showing separate application of particular parameter signals.

The circuit of FIG. 7 permits intervention in the data processing being carried out to consider particular operating or other parameters. FIG. 7 also shows the limiter stage 101 in order to limit change in ignition angle. Limiter stage 101 is independent of the system to introduce additional control parameters into the computed result; it is shown, however, in connection with the special intervention system since it is desirably used in this system because of the necessary angular values being processed.

Transfer switch 42 (FIGS. 2, 7) is again connected to address counter 22. The specific system between the address counter 22 and the accumulator counter 26 is the same as that in FIG. 2. The output of accumulator counter 26 is applied to an end value adjustment system 100, described in detail in connection with FIG. 8, and in turn to a limiter stage 101 to limit change in ignition angle. Address counter 22 is connected over a revolution matrix 102 which has an output 103 connected to a timing circuit 104 coupled to the end value adjustment system 100. The revolution matrix 102 has two connections 107, 108 connected to a double poled input 109 of limiter stage 101. Three further inputs 111, 112, 113 of the end value adjustment system 100 provide inputs for the introduction of data representative of particular or special operating conditions. Terminal 111 applies values representative of temperature δ, terminal 112 LL representative of idling condition of the engine, and terminal 113, AL, representative of start condition of the engine.

The state of the counters in the address counter 22 corresponds to angles of the crankshaft. A known ignition system triggers an ignition impulse in accordance with a predetermined count value or number introduced in the end value adjustment system 100, the number being dependent on the various operating parameters introduced at terminals 111, 112, 113. The speed matrix 102 may be constructed, for example, of AND-gates.

A separate synchronization circuit 104a is necessary in order to change values of crankshaft angle to speed. The ON time is preferably synchronized with a trigger pulse available at the output of the limiter stage 101.

Figure 8:
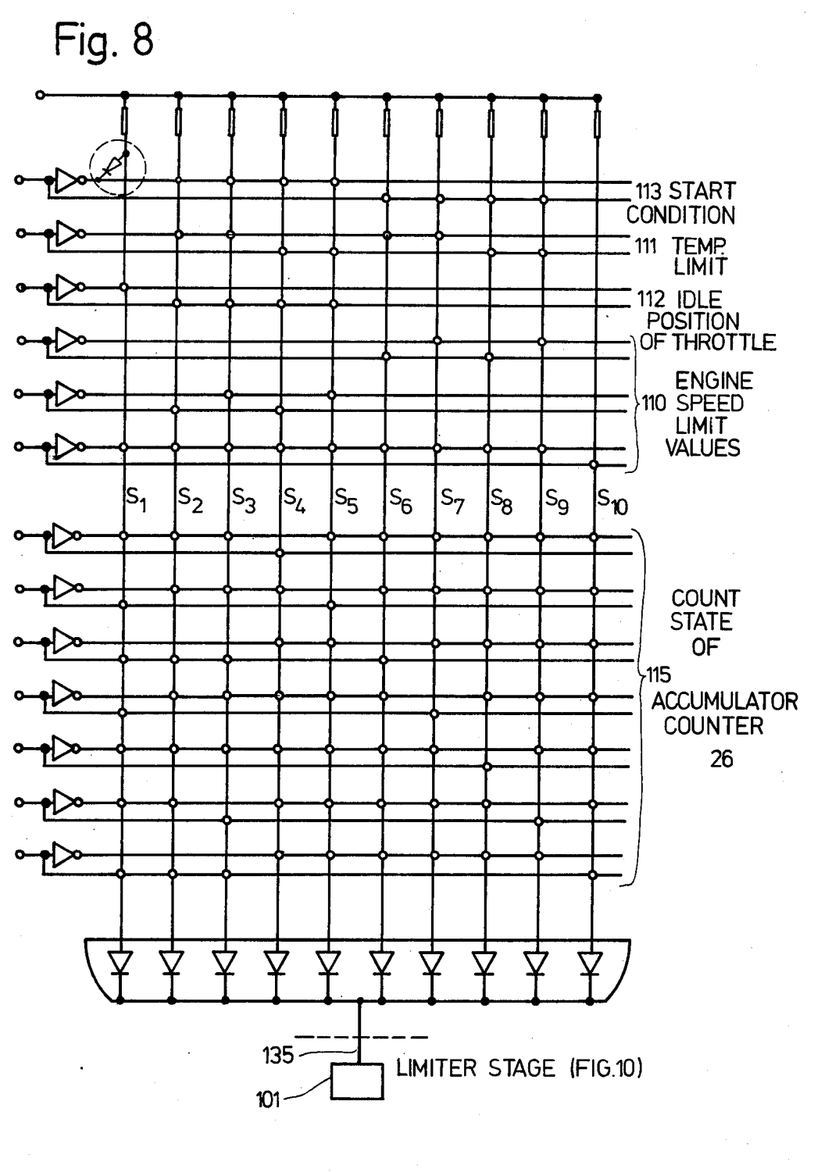
FIG. 8 is a schematic diagram of a matrix arrangement for introduction of special signal values.

End value adjustment system, FIG. 8: System 100 in general is a matrix, similar to the speed matrix 102, constructed of interconnected AND-gates. This is simple to construct with diode logic. Five inputs or, rather, input groups are provided: Inputs 110 provide engine speed limiter or threshold values; input 11 temperature limit or threshold values; input 112 position of the throttle when in idling condition, for a certain idling speed n; input 113 is enabled when the engine is under start conditions, that is, when the starter is operated; and inputs 115 have the count state of the accumulator counter 26 applied. The system 100 provides a signal to the limiter stage 101, in dependence on particular introduced signals, when the count state of the accumulator counter 26 has reached the appropriate value. Control of the various special inputs, which may occur under control of threshold switches, could cause substantial angular differences to occur between sequential output pulses, that is, between sequential ignition trigger pulses. This may cause bucking of the vehicle — which can be avoided by use of the limiter stage 101.

The matrix 102 provides output signals to lines 107, 108 for the limiter stage 101 if, for example, the count state of the address counter 22 corresponds to an angle of between 178° and 182° after the last ignition event.

The diode connections at the crossing lines of FIG. 8 are schematically indicated by little dots, only one of the diode connections being illustrated in a larger circle at the upper left side of FIG. 8, the other being similar.

Figure 9A:
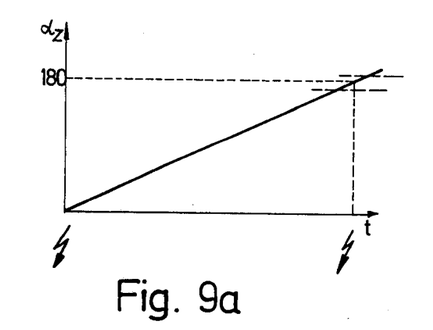
FIGS. 9a and 9b are diagrams used in connection with the explanation of limiting change in ignition timing.

Variations of the angular change by use of final or end value adjustment system 100 is graphically illustrated in FIG. 9a. The crankshaft angle is illustrated with respect to time. If the ignition instant is set at the zero point then, assuming constant speed, the crakshaft angle will be a straight line. At uniform speed, as well as with uniformly introduced special signals or intervention signals, the next ignition time will occur exactly after rotation of the crankshaft through 180°. No adjustment thus was made. Change of the ignition angle, however, will cause the ignition pulse to be either advanced or retarded. It is desired that the ignition event of a subsequent ignition occurs in the range of from 178° to 182° from the preceding ignition event, in order to avoid the aforementioned bucking or shaking of the vehicle.

Figure 9B:
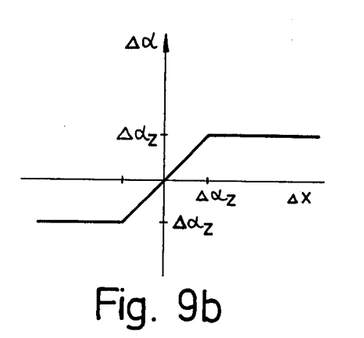
Figure 10:
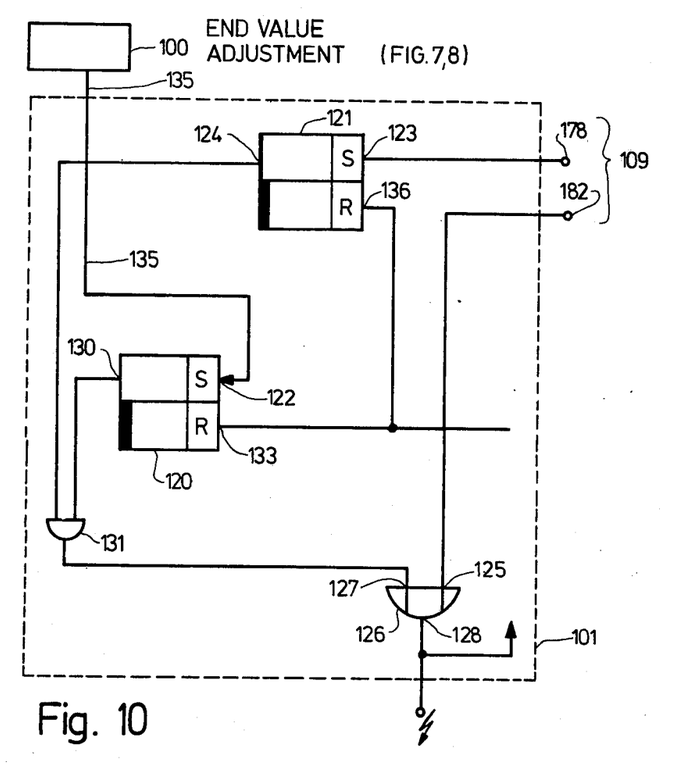
FIG. 10 is a schematic diagram of the arrangement of a limiter to limit change in ignition timing.

The ignition angle limiting operation is illustrated in connection with FIG. 9b. The abscissa illustrates the calculated or computed change in ignition angle; the ordinate illustrates the actual ignition angle with the limiter in operation. As seen in FIG. 9b, a maximum change in ignition angle of 2·Δα° between two ignition events will occur. An example of the limiter stage 101 is illustrated in FIG. 10. The limiter stage, essentially, includes two SR-FF's 120, 121. The SET input 123 of the SR-FF 121 is connected to the first terminal of the two-polarity input 109. The SET input 122 of the SR-FF 120 is connected over line 135 with the end value adjustment system 100 (FIGS. 7, 8). The direct outputs 124, 130 of the SR-FF's 120, 121 are connected to and AND-gate 131 which is connected to one input 127 of an OR-gate 126. The output 128 of OR-gate 126 forms the output of the limiter stage 101 and additionally is coupled to the reset inputs 133, 136 of the SR-FF's 121, 133. The second input 125 of the OR-gate 126 is connected to the second input of the two-polarity input 109 which may correspond to an angular value which is increased with respect to the initially provided angular value.

Operation: The limiter stage 101 has the function to provide a signal within the angular range of, for example, 178° and 182° after the prior ignition event — assuming a four-cylinder internal combustion engine. The angular range need not be symmetrical. If the pulse is received from the end value adjustment system or circuit in advance of 178° after the previous ignition event, SR 120 is SET. After the 178° pulse is received, an output signal is derived from SR 120. Within the angular range of 178° to 182°, the pulse is connected through on the line 135. If the pulse which should occur does not, however, occur before 182°, then the pulse corresponding to the angle of 182° is transmitted through the OR-gate 126 to the output of the limiter stage 101. Depending on the selection of a limiting angle, a maximum and minimum distance, or angular range with respect to the previously occurring pulse can be adjusted.

If the engine has more than four cylinders, for example eight or twelve, and if a large range of adjustment is required, then the time is insufficient between two sequential ignition pulses in order to carry out all the calculations. The possibility than arises to use the calculated angular range for several sequential ignition events without, each time, carrying out a new calculation. Calculation and triggering then must occur independently of each other. The above discussion assumed calculation and triggering to be dependent.

Figure 11:
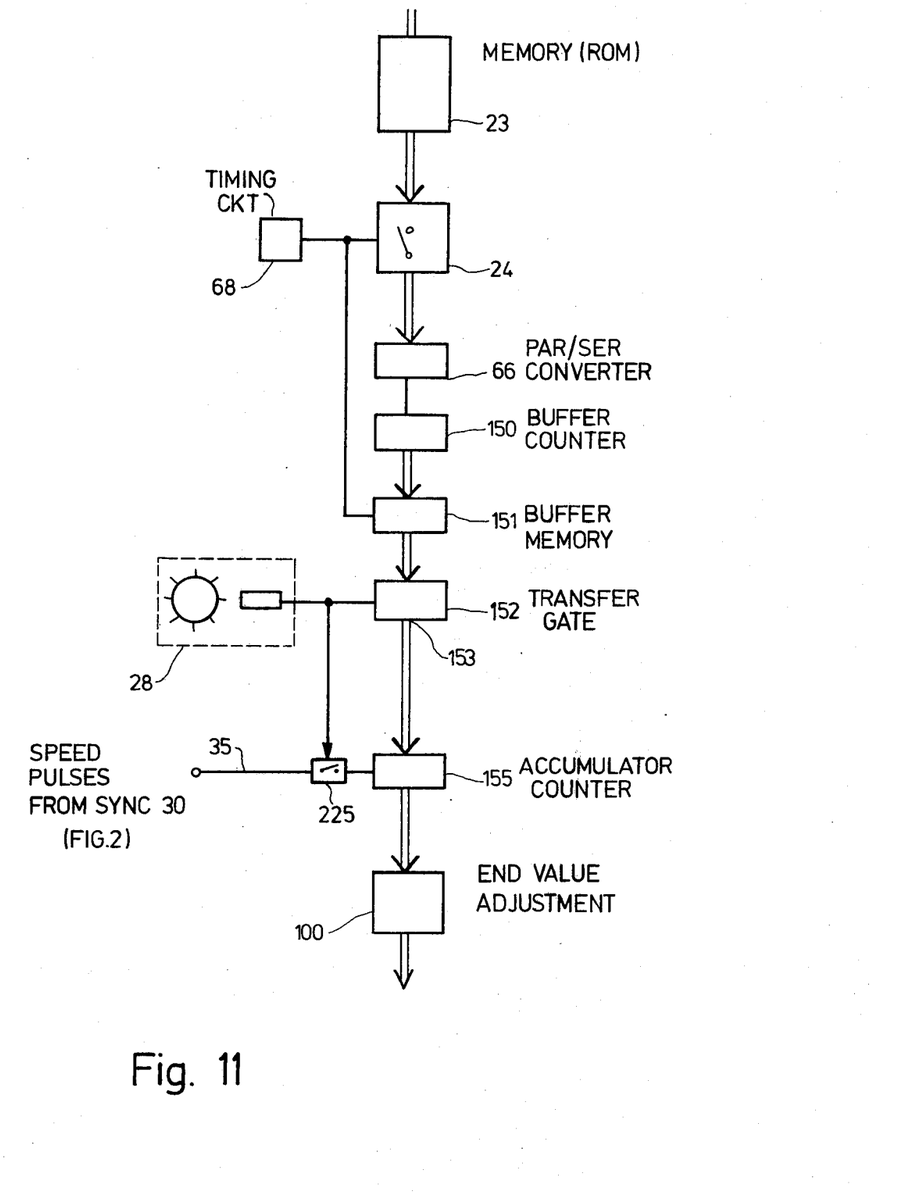
FIG. 11 is a block diagram generally illustrating the system for a cylinder number greater than four cylinders.

The calculating and switching system for an internal combustion engine with a greater number of cylinders is shown in FIG. 11. A series circuit is provided including the memory 23, transfer switch 24, and the parallel-series converter 66. A buffer counter 150 is connected to the PAR/SER converter 66 to which, serially, a buffer memory 151 is connected, in turn being serially connected to a tranfer gate 152. Transfer gate 152 is connected to a reference signal source 28', arranged to be in operative connection with the engine, and matched to the higher number of cylinders. Output 153 of the transfer gate 152 is connected to the accumulator counter 155. Accumulator counter 155 is set to the value in buffer memory 151 upon occurrence of each reference pulse from source 28'. The accumulator counter then counts with the signals from the speed source 20 which are applied thereto over a line 35 when switch 225 is closed. The accumulator counter 155 is then followed by the end value adjustment system 100 which, similar to the previously discussed system, has the various inputs to change the final value by introducing additional parameters.

The respective values derived from ROM 23 are counted during the time determined by timing circuit 68 (as in FIG. 2) in the buffer counter 150, and then stored in buffer memory 151. Buffer memory 151 provides a number which depends on load and speed for each new counting cycle. This number which need not change from cycle to cycle, that is, need not change for immediately sequential ignition events, is then used as the base number connected through the transfer gate 152 to the accumulator counter 155, where only the seed pulses from synchronizing circuit 30 (FIG. 2) are added and the final value is again modified by the end value adjustment system 100.

Figure 12:
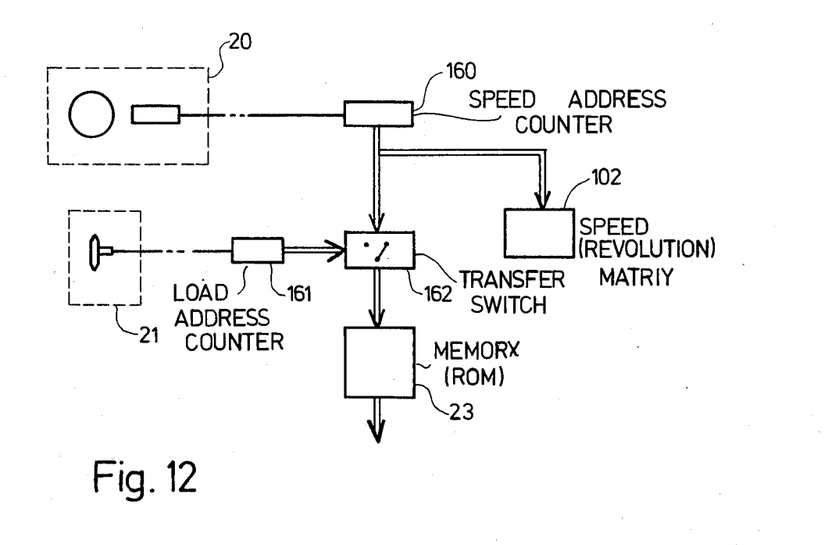
FIG. 12 is a block diagram of an arrangement for address counters for processing of load and speed signals in blocks or groups.

The load signals and speed signals, respectively, can be processed in blocks. FIG. 12 illustrates the circuit for use in such a system. Speed pulses from the speed transducer 20 are summed in a speed address counter 160. Load pulses from the load transducer 21 are summed in the load address counter 161. The counter states of the counters 160, 161 are alternately applied to the memory 23; in effect, all the speed addresses and all the load addresses are separately and sequentially scanned. The sequence — whether speed addresses or load addresses come first is irrelevant. The angle of the crankshaft for the speed matrix 102 is derived from an output coupled to the output of the speed counter 160.

If this system is selected, then scanning or strobing of the respective signals is not strictly necessary, at the cost, however, of separate speed and load address counters.

It is also possible to group and load pulses in selectively arranged groups, forming an intermediate between the strobe or scan processes of speed and load pulses and the block processing of speed and load pulses. This group arrangement must be matched, however, to the storage addresses in memory 23 with respect to the counting ranges of the address counter, or counters.

Figure 13:
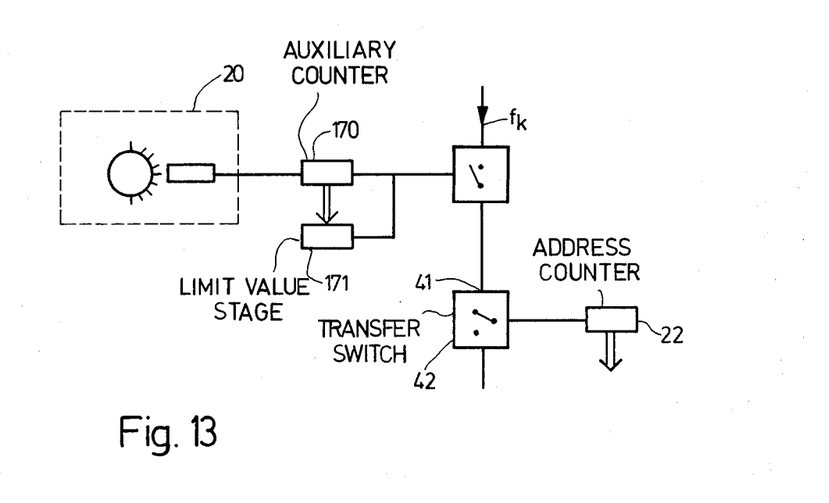
FIG. 13 is a block diagram in schematic form of the circuit arrangement of an address counter for constant counting rate.

Speed dependence of the ignition angle can be calculated in various ways. FIG. 13 illustrates another embodiment to calculate speed dependence. FIG. 2 illustrates an arrangement in which the signal derived from speed transducer 20 was synchronzied and strobed so that it could then be applied over transfer switch 42 to the address counter 22 together with the load signal. The circuit arrangement of FIG. 13, in contrast, illustrates counting of the signals from the speed transducer 20 in an auxiliary counter 170 up to a final end or limit value, determined by a limit value stage 171. The time taken from the beginning of the counting in auxiliary counter 170 until the fixed or limit value is reached will depend on speed. During this time, pulses of constant frequency $f_k$ are applied to the memory 22 through the transfer switch 42. This frequency $f_k$ may, and preferably will be strobed or scanned, and synchronized, depending on the processing system used (FIG. 2 or FIG. 12). The counting arrangement illustrated in FIG. 13 has as an effect that the count state in the address counter 22 is inversely proportional to the speed of the crankshaft. The system of FIG. 2 used an end count state in address counter 22 proportional to speed. Due to the inversion, the stored value in memory 23 must be suitably matched to the desired engine — parameter characteristics regarding the optimum ignition instant.

The system described can be used to control any cyclically repetitive event, the exact timing of which is dependent on operating or extraneous parameters. The system is particularly useful to determine the exact ignition instant, that is, the ignition timing in internal combustion engines. In comparison to systems previously used, it has the advantage of reliability, while being easily arranged to accomodate the influences of a multiplicity of operating parameters with more accurate results, considering all the additional parameters.

The elements and sub-systems used in the present invention are conventional. The following elements are suitable:

| transfer gate | 62: RCA | CD 4027A |
| memory (ROM) | 23: Intel | MF 1701R |
| parallel/serial converter | 66: RCA | CD 4014A |
| accumulator | 26: RCA | CD 4015A and |
| | RCA | CD 4032A |
| adder | 80: RCA | CD 4032A |
| shift registers | 81, 82: RCA | CD 4014A and |
| | RCA | CD 4015A |
| counter unit | 55: RCA | CD 4022A. |

The system can be simplified if the address counter has only one parameter-dependent group of pulses applied thereto, for example only the engine speed pulses.

The system can readily be constructed using integrated circuits, universally applicable for a wide variety of engines, with ready possibility of intervention in the calculated result to allow for variations of various operating, operation, or extraneous parameters so that the calculated result will accurately reflect optimum timing of an event, non-linearly dependent on the various parameters considered.

Various changes and modifications may be made, and features described in connection with any one of the embodiments may be used with any one of the others, within the scope of the inventive concept.

We claim:

1. System to control the timing of cyclically repetitive events, in dependence on operating parameters, such as ignition timing instant of ignition pulses in internal combustion engines in the light of operation of the engine, comprising first sensing means (20) sensing an operating parameter and providing output signals representative thereof;

first counter means (55, 30) connected to and controlled by said sensing means (20) providing a first sequence of counted signals ($f_m$);

second sensing means (21) sensing a second operating parameter and providing output signals representative thereof;

second counter means (55, 47) connected to and controlled by said second sensing means (21) and providing a second sequence of counted signals ($f_{rp}$);

an address counter (22) totalizing counted pulses;

a memory (23) addressed by the address counter and having stored therein at respective addresses characteristic values relating said first and second parameters, respectively, to the timing of said event;

a transfer switch (25) having input terminals (36, 37) and a transfer terminal (39);

the sensing means (20, 21), the memory (23), one input terminal (37) of the transfer switch (25), and the address counter (22) being serially connected;

a connection means between at least one of the counter means (55, 30; 55, 47) and the other input terminal (36) of the transfer switch, the transfer switch, through said connection means, shunting or bypassing the counted signals across at least the memory (23);

an accumulator counter (26, 155) totalizing counted signals and providing an output pulse triggering the ignition when a selected count number is reached;

and the accumulator counter (26) being connected to the transfer terminal (39) of the transfer switch (25).

2. System according to claim 1, further comprising a timing circuit (24, 68) providing a timing interval connected to interconnect the memory (23) with the accumulator counter (26, 155) only for a predetermined time interval, as determined by the timing circuit (24, 68).

3. System according to claim 1, wherein the address counter (22; 160, 161) is serially connected in advance of the memory (23) and has said counted signals ($f_m; f_{rp}$) representative of operating parameters applied thereto.

4. System according to claim 3, further comprising transfer switch means (42) connected between the address counter (22) and the counter means (55, 30; 55, 42) providing said sequences of counting signals and alternately applying the counted signals representative of different parameters to the address counter (22).

5. System according to claim 3, further comprising strobe pulse generating means (55) providing scanning signals to said respective counter means (30, 47) to strobe or scan the counted signals ($f_m, f_{rp}$) being applied to the address counter (22).

6. System according to claim 1, for combination with an internal combustion engine, and comprising shaft position sensing means (28) coupled to the engine and controlling the position of the transfer switch (25) as a function of the shaft position of the engine with respect to a reference position (UDC).

7. System according to claim 5, further comprising transfer switch means (42) alternately, sequentially connecting the strobed or scanned signals from the respective counter means (30, 47) to the address counter (22).

8. System according to claim 4, further comprising transfer switch means (42) applying the counted signals ($f_m; f_{rp}$) in blocks, sequentially, to the address counter (22) during any counting cycle.

9. System according to claim 1, wherein the address counter (22) comprises (FIG. 5) at least two counters (81, 82) of each n-stages.

10. System according to claim 9, wherein the counters (81, 82) are shift registers;

and an adder circuit (80) is provided, the counters and shift registers being interconnected to form, conjointly, the address counter (22).

11. System according to claim 9, further comprising a transfer gate (62) counting clock pulses applied to the address counter (22) and connecting the address counter to the input of the memory (23) after having counted n-clock pulses.

12. System according to claim 9, further including setting means (83) setting at least one (81) of the counters (81, 82) to a predetermined count number at the beginning of each counting cycle.

13. System according to claim 1, further comprising a parallel-series converter connected between the memory (23) and the transfer switch (25).

14. System according to claim 1, wherein the memory (23) contains addressable memory locations digitally storing slope values representative of slopes of the characteristic curves of change in timing of the event vs. the respective parameters.

15. System according to claim 1, further comprising (FIGS. 7, 8) and end value adjustment circuit (100) connected to the accumulator counter (26, 155) to control the count number which determines the timing of the event.

16. System according to claim 15, wherein the end value adjustment circuit comprises a plurality of inputs (110, 111, 112, 113) for input signals representative of parameters additionally affecting the timing of the event.

17. System according to claim 15, wherein (FIG. 8) the end value adjustment circuit (100) comprises a logic matrix.

18. System according to claim 1, further comprising (FIGS. 7, 10) a limiter stage (101) to limit change in timing of the event with respect to the timing of a preceding event.

19. System according to claim 18, wherein the limiter stage (101) comprises a decoding stage decoding the timing of an event with respect to a reference instant; a logic gate (126) and a logic switch (120, 121); and storage means (102) storing the timing of the event with respect to the reference and applying said timing to the logic gate (126) and logic switch (120, 121) to enable the logic gate for a subsequent cycle for time durations which vary only within predetermined limits of the timing of said first event, whereby abrupt changes in the timing of the subsequent event relative to the preceding event are limited.

20. System according to claim 1, further comprising a buffer counter (150) and a buffer memory included between the memory (23) and the accumulator counter (155) to permit processing of the counting signals ($f_m, f_{rp}$) independently of cyclical repetition of the event.

21. System according to claim 1, further comprising (FIG. 13) an auxiliary counter (170) connected between one of the sensing means and the address counter (22) to apply a constant frequency for a predetermined period of time to the address counter (22).

22. System according to claim 3, wherein the counting signals ($f_m; f_{rp}$) are applied to the address counter in sequential blocks, as they arise and are counted by said respective counter means (30, 47).

23. System according to claim 1, wherein the memory is a read-only memory (23) and stores at respective address blocks the characteristics of change in timing of the event with respect to change in respective parameters.

24. System to control the timing of ignition pulses controlling the sparking of spark plugs in internal combustion engines, with respect to upper dead-center (UDC) position of respective pistons of the engine comprising speed signal sensing means providing a speed output signal, and counter means (55, 30) providing sequentially counted pulses having a frequency representative of speed (f);

load signal sensing means (21) providing a load output signal, and counter means (47, 55) providing sequentially counted pulses having a frequency representative of loading on the engine;

an accumulator counter (26, 155) totalizing counted signals and providing an output pulse triggering the ignition when a selected count number is reached;

an address counter (22) connected to said counter means (55, 30; 55, 47) and providing an address in accordance with the count of the connected counter means;

a memory (23) addressed by the address counter (22) and storing characteristics of change in ignition angle with respect to at least one of: speed; load on the engine at selected addresses therein;

a transfer switch (25) having input terminals (36, 37) and a transfer terminal (39), the sensing means (20, 21), the memory (23), one input terminal (37) of the transfer switch (25) and the address counter (22) being serially connected, the transfer terminal (39) being connected to said accumulator counter (26, 155);

and connection means (35) between at least one of the counter means (30, 47) and the other input terminal (36) of the transfer switch (25) to shunt or bypass the counted signals across at least the memory (23) and apply the signals from one of said sensing means and the connected counter means directly to the accumulator counter (26, 155).

25. System according to claim 24, further comprising an end value adjustment circuit (100) connected to the accumulator counter (26) and modifying the timing of the ignition event with respect to the count value in the accumulator counter, the end value adjustment circuit (100) having modification inputs (110, 111, 112, 113) and adjusting said end value in accordance with at least one of: a predetermined threshold speed; a predetermined threshold temperature; position of the throttle; operating condition — idle, starting — of the engine, said at least one parameter being applied to at least one of said inputs.

26. System according to claim 24, further comprising a buffer counter (150) and a buffer memory (151) connected between the memory (23) and the accumulator counter (155) to accumulate count numbers representative of changes in parameter during more than one operating cycle of sequentially occurring ignition events, whereby the processing of the at least one speed or load signal with respect to ignition timing can be carried out at a rate extending beyond the time between successive ignition events at maximum engine speed.

27. System according to claim 25, further comprising a limit stage (101) limiting change in ignition angle with respect to the ignition angle of a preceding ignition pulse relative to the UDC position of the piston to prevent abrupt change of the ignition angle and hence bucking of the engine.

28. System according to claim 24, further comprising shaft position sensing means (28) coupled to the shaft of the internal combustion engine, the output of said sensing means controlling the position of the transfer switch (25) as a function of shaft position of the engine with respect to a reference position (UDC).

29. System according to claim 28, wherein the transfer switch (25) is in a position coupling said one input (37) to the transfer terminal (39) until said shaft position sensing means (28) provides an output signal to change the position of the transfer switch (25) to bypass counted signals across at least the memory and apply said signals from one of said sensing means and the connected counter means from the other input terminal (36) directly to the transfer terminal (39) and hence to said accumulator counter (26, 155).

30. System according to claim 29, further comprising signal means (95) resetting the address counter (22) and the accumulator counter (26) to a predetermined number upon start of any one counting cycle so that, upon initiation of the counting cycle, the accumulator counter will accumulate the data derived from the memory (23) as addressed by the address counter (22) with the signals being transferred through said one input terminal (37) of the transfer switch (25), and wherein the position sensing means (28) provides its output signal intermediate the duration of the cycle to bypass the memory and store data representative of the sensing means and the connected counter means directly in the accumulator counter (26) after the position sensing means (28) has sensed a predetermined shaft position of the engine with respect to the reference position (UDC) so that, in the final count accumulation, the directly derived signals from the counter means of the respective sensing means will be accumulated in the accumulator counter (26, 155).

31. System according to claim 24, further comprising a timing circuit (68) and a timing switch (24), the timing circuit providing a timing interval, said switch interconnecting the memory (23) to the accumulator counter (25, 155) only for a predetermined time interval, as determined by the timing circuit.

* * * * *